United States Patent
Green et al.

(10) Patent No.: US 7,036,983 B2
(45) Date of Patent: May 2, 2006

(54) THERMOCOUPLE FOR USE IN GASIFICATION PROCESS

(75) Inventors: Steven R. Green, El Dorado, KS (US); David L. Powell, Jr., Augusta, KS (US)

(73) Assignee: General Electric Company, Schenectady, NY (US)

(*) Notice: Subject to any disclaimer, the term of this patent is extended or adjusted under 35 U.S.C. 154(b) by 299 days.

(21) Appl. No.: 10/184,279

(22) Filed: Jun. 27, 2002

(65) Prior Publication Data
US 2002/0159500 A1 Oct. 31, 2002

Related U.S. Application Data

(63) Continuation of application No. 09/867,000, filed on May 25, 2001, now abandoned, which is a continuation of application No. 09/106,133, filed on Jun. 26, 1998, now abandoned.

(51) Int. Cl.
| | |
|---|---|
| G01K 1/14 | (2006.01) |
| G01K 13/00 | (2006.01) |
| G01K 7/04 | (2006.01) |
| H01L 35/02 | (2006.01) |

(52) U.S. Cl. .................. 374/179; 374/208; 374/141; 136/232

(58) Field of Classification Search ............ 374/179, 374/141, 208; 136/232, 230, 234
See application file for complete search history.

(56) References Cited

U.S. PATENT DOCUMENTS

| | | | | |
|---|---|---|---|---|
| 2,818,326 A | 12/1957 | Eastman et al. | .............. | 48/212 |
| 2,963,353 A | 12/1960 | Eastman | ....................... | 422/19 |
| 3,263,502 A | 8/1966 | Springfield | ................. | 374/179 |
| 3,598,380 A | 8/1971 | Jilek et al. | .................. | 374/179 |
| 4,776,705 A * | 10/1988 | Najjar et al. | ................ | 374/141 |
| 5,000,580 A | 3/1991 | Leininger et al. | ........... | 374/130 |
| 5,005,986 A | 4/1991 | Najjar et al. | ................ | 374/179 |
| 5,071,258 A | 12/1991 | Usher et al. | ................ | 374/179 |
| 5,147,137 A * | 9/1992 | Thiesen | ...................... | 374/179 |
| 5,172,979 A | 12/1992 | Barkley et al. | ............. | 374/147 |
| 5,181,779 A | 1/1993 | Shia et al. | .................. | 374/179 |
| 5,242,226 A | 9/1993 | Ross et al. | .................. | 374/208 |
| 5,463,222 A | 10/1995 | Lesko et al. | ................ | 250/330 |
| 5,474,618 A | 12/1995 | Allaire | ....................... | 136/234 |
| 5,712,165 A | 1/1998 | Alvarez et al. | .............. | 436/21 |
| 5,718,512 A | 2/1998 | Ngo-Beelmann | .......... | 374/148 |
| 5,736,092 A | 4/1998 | Apté et al. | .................. | 264/432 |
| 6,059,453 A | 5/2000 | Kempf et al. | ............... | 374/179 |

FOREIGN PATENT DOCUMENTS

| | | | |
|---|---|---|---|
| DE | 91 09 308.2 | 11/1992 | |
| EP | 356593 A1 * | 3/1990 | ................. 374/141 |
| GB | 1 119 338 A | 7/1968 | |
| WO | WO 93/10427 | 5/1993 | |

OTHER PUBLICATIONS

Winterhagen, D.; et al., "Vacuum–tight probe for a thermal element," English Language Translation of WO 93/10427 A1, published May 27, 1993 (in German), PTO 2004–0484, 11 pages.*
Cushing, Frank S., *New Developments in F–O Sensor Probe Design*, Sensors, pp. 49–54 (Sept. 1994).
*Solutions in Sapphire*, vol. 1, No. 1, (Feb. 1997).
Sosman, R.B., *Pyrometry by Thermocouples*, pp. 29–33 (1940).

* cited by examiner

*Primary Examiner*—Diego Gutierrez
*Assistant Examiner*—Stanley J. Pruchnic, Jr.

(57) ABSTRACT

An improved apparatus comprising a thermocouple for measuring the temperature in a gasification process is provided. The improvement comprises a sapphire envelope for enclosing at least a portion of the thermocouple. The sapphire envelope may be in the form of a sapphire sheath fitted over the thermocouple. The apparatus may also comprise a thermowell, with the sapphire envelope being provided by the thermowell.

20 Claims, 2 Drawing Sheets

THERMOCOUPLE FOR USE IN GASIFICATION PROCESS

This is a continuation of application Ser. No. 09/867,000, filed May 25, 2001 (now abandoned), which is a continuation of application Ser. No. 09/106,133, filed Jun. 26, 1998 (now abandoned).

FIELD OF THE INVENTION

This invention relates generally to a thermocouple used in a gasification process and, more particularly, to the use of sapphire to extend the useful life of thermocouples used in a gasification process.

BACKGROUND AND SUMMARY OF THE INVENTION

In high temperature gasification processes, a hot partial oxidation gas is produced from hydrocarbonaceous fuels, for example coal. In these processes, the hydrocarbonaceous fuels are reacted with a reactive oxygen-containing gas, such as air or oxygen, in a gasification reactor to obtain the hot partial oxidation gas.

In a typical gasification process, the hot partial oxidation gas will substantially comprise $H_2$, CO, and at least one gas from the group $H_2O$, $CO_2$, $H_2S$, COS, $NH_3$, $N_2$, Ar, along with particulate carbon, ash, and/or molten slag typically containing species such as $SiO_2$, $Al_2O_3$, and the oxides and oxysulfides of metals such as Fe and Ca.

The hot partial oxidation gas in the gasification reactor will commonly be at a temperature ranging from 1,700° to 3,000° F., and more typically in the range of about 2,000° to 2,800° F., and at a pressure commonly in the range of about 1 to about 250 atmospheres, and more typically in the range of about 15 to 150 atmospheres.

Thermocouples are commonly used for measuring temperature in these high temperature processes. The thermocouples can be used to measure the temperature in the gasification reactor. They may also be used to measure the temperature in downstream process steps in which the effluent is cooled and particulate and gaseous contaminants are removed.

Thermocouples are pairs of wires of dissimilar metals which are connected at both ends. The content of the wires must be sufficiently dissimilar to allow for a difference in electrical potential between them. Except for the ends, the two wires are electrically insulated from each other. The electrical insulation is commonly provided by a tube of insulating material having two non-intersecting holes passing lengthwise through the tube. Typical insulating materials include high temperature, high purity ceramics, such as alumina.

When the two junctions of the wires are at different temperatures, a difference in electrical potential exists between them. The difference in electrical potential and therefore the difference in temperature can be measured by a voltage measuring instrument placed in the thermocouple circuit or alternatively by a voltage measuring instrument that is sent signals by a transmitter placed in the thermocouple circuit.

The choice of dissimilar metals used for the thermocouple will vary depending on, among other things, the expected temperature range to be measured. For instance, one type of thermocouple commonly employed under the conditions present in a gasification reactor has one wire that contains platinum and about 30% rhodium and a second wire that contains platinum and about 6% rhodium. Other pairs of metals are used for different temperature ranges.

One problem apparent with the use of thermocouples in the environment present in a gasification process, particularly the environment present in the gasification reactor, is the relatively short lifespan of the thermocouples. The relatively short lifespan is due in part to the extremely high temperatures and corrosive atmosphere that prevails during the operation of the gasification reactor. An unprotected thermocouple left in this environment is quickly attacked and rendered useless. Such attack can be most severe when the thermocouple comes into contact with molten slag present in the reactor.

To alleviate this problem, thermocouples are commonly inserted into a refractory thermowell disposed along the outer wall of a gasification reactor or other exterior process surface. The refractory thermowells would include barriers of chrome-magnesia, high chrome, or similar slag resistant materials, and may incorporate other refractory and non-refractory materials such as $Al_2O_3$, MgO, and stainless steel.

When used in a gasification reactor, the thermowell may be introduced by passing it through an opening in the outer wall of the reactor pressure vessel. The thermowell may then pass through a corresponding opening in a refractory material, or series of refractory materials, commonly used to line the inner surface of the reactor pressure vessel. The thermowell may extend into the open space of the reactor or it may be set is back at a slight distance from the interior of the reactor.

Unfortunately, positioning the thermocouple inside a thermowell has not provided a complete solution. Over time, molten slag will breach the thermowell. The breach is commonly due to the effects of erosion and corrosion as well as thermal and/or mechanical stress. However, the breach may also be due, totally or in part, to an inherent fault in the thermowell. The breach, typically small initially, allows molten slag to enter the thermowell where it can come in contact with the thermocouple, rendering it useless.

It would therefore be beneficial to have a means to increase the lifespan of thermocouples used in a gasification process.

In accordance with one aspect of the present invention, an improved apparatus comprising a thermocouple for measuring the temperature in a gasification process is provided. The improvement comprises a sapphire envelope for enclosing at least a portion of the thermocouple. The sapphire envelope may be in the form of a sapphire sheath fitted over the thermocouple. The apparatus may also comprise a thermowell, with the sapphire envelope being provided by the thermowell.

In accordance with another aspect of the invention, an improved apparatus for measuring the temperature in a gasification process comprising a thermowell and one or more thermocouples is provided. The improvement comprises a sapphire envelope for enclosing at least a portion of at least one thermocouple. The sapphire envelope may be in the form of a sapphire sheath fitted over the thermocouple. The thermowell may contain at least one barrier layer comprised of sapphire, with the sapphire envelope being equivalent to the barrier layer comprised of sapphire.

DESCRIPTION OF ILLUSTRATIVE EMBODIMENTS

Figure 1:
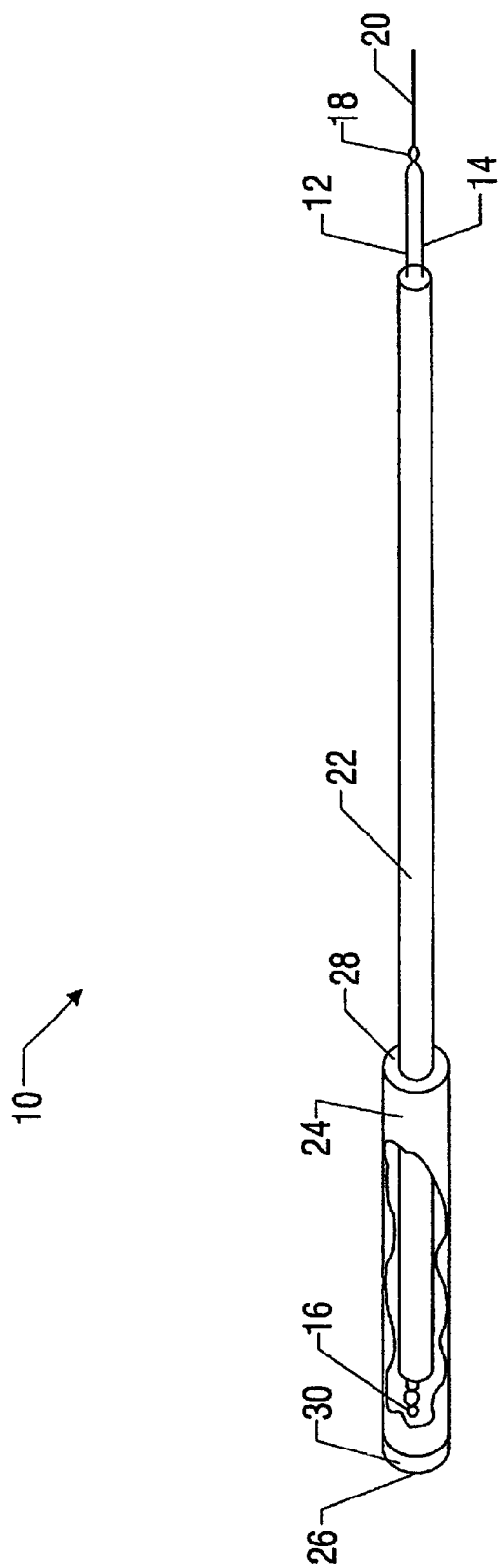
FIG. 1 depicts a thermocouple produced in accordance with one aspect of the invention.

Gaseous mixtures substantially comprising $H_2$, CO, and at least one gas from the group $H_2O$, $CO_2$, $H_2S$, COS, $NH_3$, $N_2$, Ar, along with particulate carbon, ash and/or molten slag typically containing species such as $SiO_2$, $Al_2O_3$, and the oxides and oxysulfides of metals such as Fe and Ca are commonly produced by well known partial oxidation processes in the reaction zone of a free-flow, down-flowing vertical refractory lined steel pressure vessel. An example of such a process and pressure vessel are shown and described in coassigned U.S. Pat. No. 2,818,326 hereby incorporated by reference. In such a process, the partial oxidation gas will typically be subjected to cooling and additional purification steps in which particulate contaminants, gaseous contaminants, and water vapor are removed.

The partial oxidation gas produced from such a process will, depending on chemical composition and intended end use, commonly be referred to as synthesis gas, fuel gas, or reducing gas. The generic partial oxidation gas will be referred to herein as encompassing all of these potentialities.

The feed used to produce the partial oxidation gas comprises hydrocarbonaceous fuels. The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". For example, there are (1) pumpable slurries of solid carbonaceous fuels, such as particulate carbon dispersed in a vaporizable liquid carrier, such as water, liquid hydrocarbon fuel, and mixtures thereof; and (2) gas-liquid-solid dispersions, such as atomized liquid hydrocarbon fuel and particulate carbon dispersed in a temperature moderating gas.

The term "liquid hydrocarbon," as used herein to describe suitable liquid feedstocks, is intended to include various materials, such as liquefied petroleum gas, petroleum distillates and residua, gasoline, naphtha, kerosene, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

"Gaseous hydrocarbons," as used herein to describe suitable gaseous feedstocks, include methane, ethane, propane, butane, pentane, natural gas, coke-oven gas, refinery gas, acetylene tail gas, ethylene off-gas, and mixtures thereof.

"Solid hydrocarbon fuels," as used herein to describe suitable solid feedstocks, include, coal in the form of anthracite, bituminous, subbituminous; lignite; coke; residue derived from coal liquefaction; peat; oil shale; tar sands; petroleum coke; pitch; particulate carbon (soot or ash); solid carbon-containing waste materials, such as sewage; and mixtures thereof.

Solid, gaseous, and liquid feeds may be mixed and used simultaneously; and these may include paraffinic, olefinic, acetylenic, naphthenic, and aromatic compounds in any proportion. Also included within the definition of the term "hydrocarbonaceous" are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

In the reaction zone of a gasification reactor, the hydrocarbonaceous fuel is contacted with a free-oxygen containing gas, optionally in the presence of a temperature moderator. The reaction time will typically be in the range of about 1 to 10 seconds, and preferably about 2 to 6 seconds. In the reaction zone, the contents will commonly reach temperatures in the range of about 1,700° to 3,000° F., and more typically in the range of about 2,000° to 2,800° F. Pressure will typically be in the range of about 1 to about 250 atmospheres, and more typically in the range of about 15 to about 150 atmospheres. As the partial oxidation gas proceeds downstream, the temperature of the flow will be reduced as the gas is subjected to various cooling, washing, and other steps.

In accordance with the present invention, temperature may be measured at various locations within the gasification process by thermocouples having employed therewith a sapphire envelope. The use of a sapphire envelope in accordance with the various embodiments of the invention, amongst other advantages, increases the useful life of the thermocouple over conventional thermocouples. In its various embodiments, the sapphire envelope will enclose at least a portion of a thermocouple with which it is employed. The use of the sapphire envelope is particularly advantageous when it is used in conjunction with thermocouples positioned so as to measure the temperature in the gasification reactor, as the detrimental effects of high temperatures, molten slag, and corrosives are most prevalent in the reactor.

In one embodiment of the present invention, the sapphire envelope is manifested in the form of a sapphire sheath 24 that fits over at least a portion of a thermocouple. In this embodiment, illustrated in FIG. 1, a thermocouple 10 is provided. The thermocouple 10 is comprised of a pair of wires 12 and 14. The wires have dissimilar metal content such that a difference in electrical potential can develop between them when the thermocouple is exposed to a heat source. The wires, for example, may both contain platinum and rhodium as their primary substituents with the amounts of platinum and rhodium being different in the two wires. Preferably one of the wires has about 30% rhodium while the other wire has about 6% rhodium. For both wires, the remainder is primarily platinum.

The wires are joined to each other at a hot junction 16 and cold junction 18. The terms "hot" and "cold" are used because when employed to measure the temperature of a gasification reactor the hot junction 16 is positioned closer to the heat source. The difference between the electrical potential of the two wires, being representative of the temperature at the hot end, is measured. It is not critical how the difference in potential is measured. In fact, various means are known to those of ordinary skill in the art for measuring the difference in electrical potential. Any of these methods can be used in the present invention. For example, a voltage meter can be placed in the thermocouple circuit. Alternatively, and preferably, the cold junction 18 is provided at a temperature transmitter. The signal generated by the temperature transmitter can then be relayed to a control room or other location by signal transfer means 20.

Except for the hot and cold junctions, the two wires 12 and 14 are otherwise electrically insulated from each other. While it is not critical how insulated, in this embodiment, the electrical insulation 22 is provided by a high temperature, high purity ceramic tube. Such a ceramic tube can be made of, for example, alumina.

If the thermocouple disclosed to this point was utilized alone or in combination with a typical thermowell in order to measure the temperature of a gasification reactor, the thermocouple would, as disclosed, succumb to the slag and other detrimental materials present in the reactor relatively quickly. It is for this reason that in the present embodiment a sapphire sheath 24 is provided to fit over at least a portion of the thermocouple. The sapphire sheath 24 is substantially resistant to attack from the slag and other products of the gasification process. The completed thermocouple, comprising the improved sapphire sheath 24, can thus be viewed as having a distal end 26 adjacent to the hot junction 16.

It is necessary that the sapphire sheath 24 enclose at least the hot junction 16. Preferably, and as subsequently detailed, the sapphire sheath 24 will be of sufficient length such that before the molten slag reaches the top of the sapphire sheath 24 the molten slag will cool and reach a state of nominal or zero flow or a breach will form at some other point on the sapphire sheath.

In the present embodiment, the sapphire sheath 24 is substantially tubular having an enclosed end, being equivalent to the distal end 26 of the thermocouple, and an open end 28, the opening at the open end 28 being capable of receiving and fitting over the existing thermocouple comprised of the two wires 12 and 14 and the electrical insulation 22 surrounding and insulating the wires. In a variation of the embodiment, an enlarged plug 30 of sapphire is provided at the enclosed end of the sapphire sheath 24. The enlarged-plug 30 increases the time it takes for the slag to penetrate the, sapphire sheath 24. The presence of enlarged plug 30, in its simplest form, may be due to the fact that the sheath may be inherently thicker at the enclosed end than on its sides.

In the present embodiment, the sapphire sheath 24 fits over and covers only a portion of the existing thermocouple. The open end 28 advantageously should fit tightly over electrical insulation 22. Platinum foil wrapped around the electrical insulation 22 or wrapped around the inner surface of the sheath 24 can be advantageously used to provide a good fit for the sapphire sheath 24. In other embodiments, the sapphire sheath 24 may extend over and cover a larger portion, if not substantially all of the existing thermocouple. In still other embodiments, sapphire may be used to both electrically insulate the two wires as well as sheath the wires. In such an embodiment, the sapphire sheath 24 and the electrical insulation 22 would both be comprised of sapphire.

In other embodiments of the invention, any one of the disclosed thermocouples having a sapphire sheath 24 is advantageously combined with a thermowell. The combined apparatus is advantageously used to measure the temperature in a gasification process, particularly in a gasification reactor. Any thermowell commonly used or subsequently developed by one of ordinary skill in the art can be employed. Such thermowells would include barriers of chrome-magnesia, high chrome, or similar slag resistant materials, and may incorporate other refractory and non-refractory materials such as $Al_2O_3$, MgO, and stainless steel.

Figure 2:
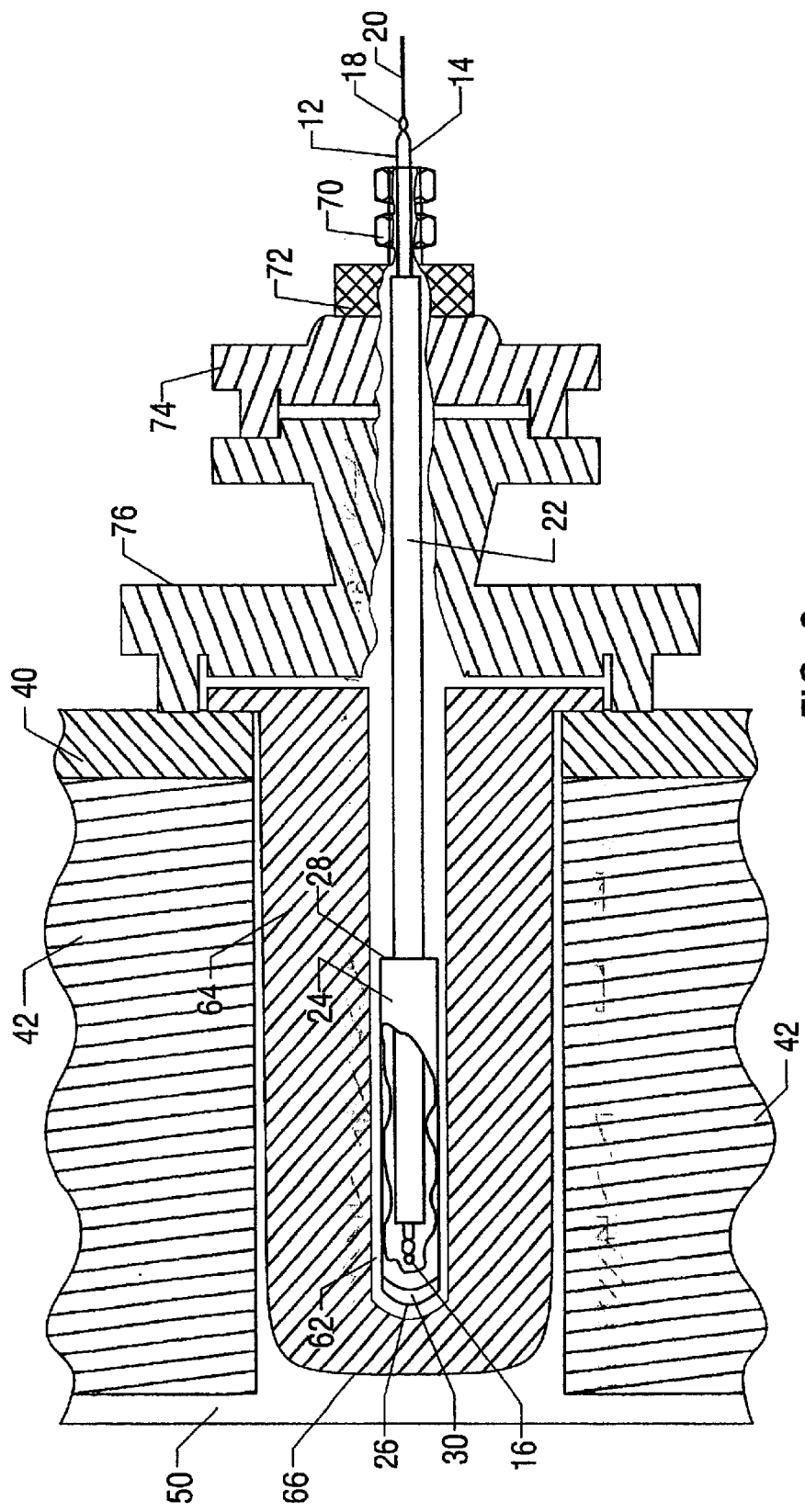
FIG. 2 depicts a segmentary view in cross-section of a portion of gasification reactor wall in which a thermocouple and thermowell are installed in accordance with one aspect of the invention.

In a preferred thermowell, illustrated in combination with a thermocouple of the present invention in FIG. 2, the thermowell is comprised of an inner protection tube 62 and an outer protection tube 64. The inner protection tube 62 can be formed from a high density low porosity refractory, such as alumina or magnesia. A castable refractory material, typically a high density low porosity refractory, is then poured around the inner protection tube 62 and allowed to set so as to form the outer protection tube 64 around all but the opening of the inner protection tube 62. Preferably, this castable high density low porosity refractory material is comprised of chromium oxide or chromia-magnesia.

In this embodiment the thermocouple 10 is inserted into the thermowell, distal end 26 first. The thermocouple 10 is passed through a flanged reducer 76 and into the thermowell in contact with and mated to the flanged reducer 76. The distal end 26 of the thermocouple 10 is positioned adjacent to the tip 66 of the thermowell. A gap of about 0.125 to about 0.25 inches is preferably maintained between the inside surface of tip 66 of the thermowell and the distal end 26 of the thermocouple.

The upstream ends of the wires 12 and 14 of the thermocouple 10 extend past the back end of the electrical insulation 22, and/or the sapphire sheath 24 if the sheath is coterminous with the electrical insulation 22. The wires pass through a pressure sealing fitting 70. The pressure sealing fitting 70 contacts a bushing 72 which fits into a removable flange 74. The flange 74 mates with flange reducer 76 that is mated to the outer steel wall 40 of the pressure vessel gasification reactor.

The thermocouple 10 and thermowell assembly is held in place by bolting or clamping together flange 74 to flange reducer 76 and similarly bolting or clamping together flange reducer 76 to the outer steel wall 40 of the pressure vessel gasification reactor. The use of two separate connections provides for increased efficiency in that a thermocouple 10 can be replaced without removing the thermowell. Instead of mating flanges, threaded caps and nozzles or other connection means can be used.

The thermowell, with or without attached thermocouple 10, is passed in succession straight through a hole in the steel wall 40 of the pressure vessel gasification reactor and then through an aligned hole in the refractory 42 lining the wall on the inside of the pressure vessel. The tip 66 of the thermowell is preferably positioned so as to be retracted from about 0.25 to about 0.75 inches, preferably 0.5 inches, from the face of the refractory 42 lining the inside steel wall of the pressure vessel reactor. In this manner, the rate of erosion is reduced as opposed to when the tip 66 of the thermowell is positioned even with the face of the refractory 42 or beyond the face of the refractory 42.

The thermocouple 10 and thermowell assembly positioned in a gasification reactor exhibits increased resistance to slag. In the gasification reactor, molten slag 50 deposits out on the inside walls of the refractory 42 lining the inside steel wall of the pressure vessel reactor. The molten slag 50 will migrate toward the thermowell. As disclosed, over time the effects of erosion and corrosion as well as thermal and/or mechanical stress may cause a small breach in the tip 66 of the thermowell. When this occurs, the molten slag 50 will, moving toward cool spots, migrate through the breach and enter the inner protection tube 62, thereby coming in contact with the sapphire sheathed thermocouple. Advantageously, with the sapphire sheath 24, the wires 12 and 14 and hot junction 16 are shielded from the molten slag 50 and its destructive effects. The molten slag 50 will continue to migrate up the interior of the inner protection tube 62 until it cools to the point at which it achieves a state of zero or nominal flow. Because of this, the sapphire sheath 24 should be of sufficient length such that before the slag can reach the open end 28 of the sapphire sheath 24, one of two things will occur: the molten slag 50 will achieve thermal equilibrium, cool, and achieve a state of nominal or zero flow; or a breach will form at some other point on the sapphire sheath. This second possibility might occur first when the effects of erosion and corrosion as well as thermal and/or mechanical stress cause the entire tip 66 of the thermowell to be removed. When this occurs, the sapphire sheath 24 becomes onset by the fill effects of erosion and corrosion in the gasification reactor. A breach ultimately forms in the sapphire sheath 24. With the wires 12 and 14 and the hot junction 16 unprotected, the thermocouple 10 fails. The selection of an appropriate length for the sapphire sheath 24 is within the skill of one of ordinary skill in the art having knowledge of the characteristics of their specific process, including temperature and gas composition, and having the benefit of this disclosure.

In other embodiments, one or more, and preferably three, thermocouples are inserted into a thermowell having at least a corresponding number of inner protection tubes 62. In such a preferred embodiment, the distal ends of the one or more thermocouples are advantageously positioned at different points along the length of the thermowell. This arrangement provides for increased times between thermocouple and thermowell replacement. For example, in an embodiment in which a total of three thermocouples are used, slag ultimately penetrating the thermowell will reach the thermocouple positioned closest to the tip 66 first. This thermocouple will subsequently fail. It then takes an additional amount of time for the slag to reach and cause the failures of the second and third thermocouples. Thus, the process can be run longer without need for shut down. While the accuracy provided by the second and third thermocouples is not as good as the first thermocouple, the difference does not pose a problem for process control as the readings for the second and third thermocouples may be corrected based on data gathered prior to the failure of the first thermocouple.

In other embodiments, the sapphire envelope can be provided by utilizing a thermowell fabricated wholly or in part from sapphire. Such a thermowell could have sapphire, preferably in the form of sapphire fiber, intermixed throughout the thermowell. Such a thermowell could also have at least one substantially continuous barrier layer comprised of sapphire. These thermowells could be used with a thermocouple that did not have a separate sapphire sheath. Alternatively, these thermowells could be employed with sapphire sheathed thermocouples. In one illustrative embodiment of a thermowell having at least one substantially continuous barrier layer comprised of sapphire, an inner protection tube 62 of the thermowell could be formed of sapphire.

In other embodiments, a thermocouple having a sapphire sheath could be used without a thermowell to measure the temperature in a gasification process. However, this alternative is not preferred where the thermocouple would be exposed to molten slag. While a thermocouple sheathed with sapphire will withstand the full effects of erosion and corrosion in the gasification reactor for a longer time than a thermocouple not having a sapphire shield, the use of a thermocouple having a sapphire shield in conjunction with a thermowell dramatically increases the lifespan of the thermocouple so used.

What is claimed is:

1. In an apparatus comprising a thermocouple for measuring the temperature in a gasification process, said thermocouple comprising a pair of wires of dissimilar metal content joined together at one end by a hot junction and at the other end by a cold junction but otherwise electrically insulated from each other, the improvement comprising a sapphire sheath fitted over at least the hot junction of said thermocouple, wherein said sapphire sheath has an open end for receiving said hot junction of said thermocouple and a closed distal end and wherein said sapphire sheath is of sufficient length such that, only due to said sufficient length, slag generated in said gasification process and exposed to said distal end of said sapphire sheath will form a breach in the sapphire sheath before the slag can reach said open end of said sapphire sheath.

2. The apparatus of claim 1, further comprising a thermowell surrounding said thermocouple.

3. The apparatus of claim 2, wherein said thermowell is comprised of an inner protection tube and an outer protection tube and wherein said inner protection tube is comprised of sapphire and said outer protection tube is not comprised of sapphire.

4. The apparatus of claim 2, wherein the gasification process employs as a reactor a vertical free-flowing refractory lined cylindrical steel pressure vessel, and wherein the thermocouple fitted in the sapphire sheath is installed in the gasification reactor by being passed in succession straight through a flanged reducer and into the thermowell connected to the flanged reducer, the thermowell being installed in the gasification reactor by first passing it through a hole in the steel wall of the pressure vessel and by then passing it through an aligned hole in the refractory lining the wall on the inside of the pressure vessel.

5. The apparatus of claim 2, wherein said thermowell is comprised of an inner protection tube and an outer protection tube and wherein said inner protection tube is comprised of alumina.

6. The apparatus of claim 1, wherein the thermocouple is under the ambient pressure of the gasification process.

7. The apparatus of claim 1, wherein the temperatures to be measured range from about 1,700° F. to about 3,000° F.

8. The apparatus of claim 1, wherein the pair of wires are comprised of platinum, rhodium, or mixtures thereof.

9. The apparatus of claim 1, wherein the pair of wires are electrically insulated from each other by an insulating tube comprised of alumina.

10. The apparatus of claim 1, wherein the pair of wires are electrically insulated from each other by an insulating tube comprised of sapphire.

11. The apparatus of claim 1, wherein the sapphire sheath does not fit over the entire thermocouple.

12. In an apparatus for measuring the temperature in a gasification process, said gasification process employing a reactor comprising a vertical free-flow refractory lined pressure vessel, said apparatus comprising a thermowell, having an inner protection tube and an outer protection tube, and one or more thermocouples, said one or more thermocouples independently comprising a pair of wires of dissimilar metal content joined together at one end by a hot junction and at the other end by a cold junction but otherwise electrically insulated from each other; the improvement comprising the inner protection tube of the thermowell being comprised of sapphire and wherein said outer protection tube is not comprised of sapphire, and further comprising a sapphire sheath fitted over at least the hot junction of at least one thermocouple, wherein said sapphire sheath has an open end for receiving said hot junction of said thermocouple and a closed distal end and wherein said sapphire sheath is of sufficient length such that, only due to said sufficient length, slag generated in said gasification process and exposed to said distal end of said sapphire sheath will form a breach in the sapphire sheath before the slag can reach said open end of said sapphire sheath.

13. The apparatus of claim 12, said thermowell being installed in the reactor by first passing it through a hole in the steel wall of the pressure vessel and by then passing it through an aligned hole in the refractory lining the wall on the inside of the pressure vessel, the one or more thermocouples being installed in the reactor by passing the thermocouples in succession straight through a flanged reducer and into the thermowell connected to the flanged reducer.

14. The apparatus of claim 12, wherein the one or more thermocouples are under ambient pressure of the gasification process.

15. The apparatus of claim 12, wherein the temperatures to be measured range from about 1,700° F. to about 3,000° F.

16. The apparatus of claim 12, wherein the pair of wires are comprised of platinum, rhodium, or mixtures thereof.

17. The apparatus of claim 12, wherein the pair of wires are electrically insulated from each other by an insulating tube comprised of alumina.

18. The apparatus of claim 12, wherein the pair of wires are electrically insulated from each other by an insulating tube comprised of sapphire.

19. The apparatus of claim 12, wherein the number of thermocouples is greater than one.

20. The apparatus of claim 19, wherein for each thermocouple in excess of one, the hot junctions of the thermocouples are positioned at different points along the length of the thermowell.

* * * * *